Dec. 19, 1967 W. V. MONTGOMERY 3,358,507
SEPTIC TANK SLUDGE INDICATOR
Filed April 4, 1966
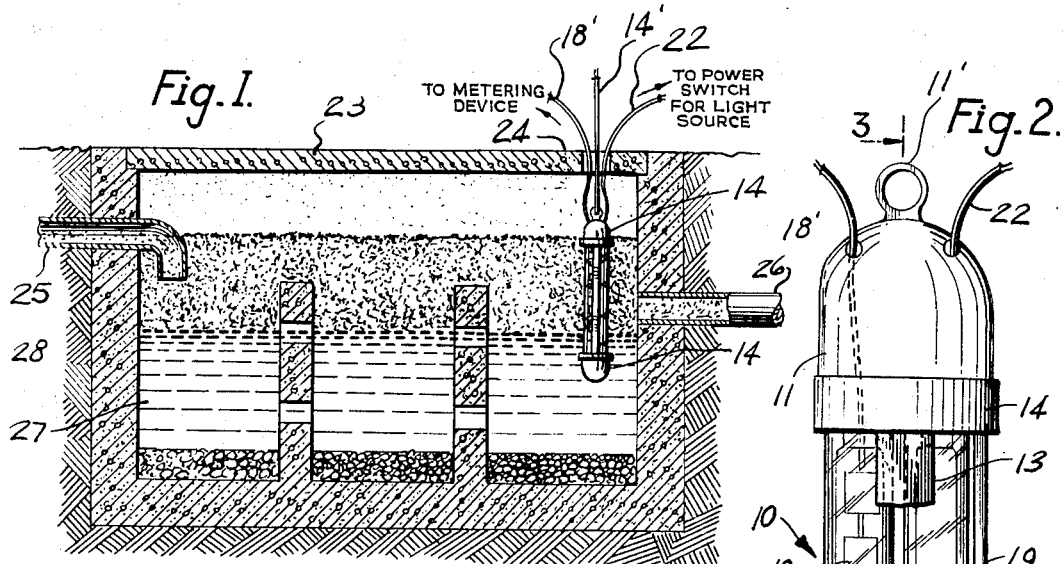
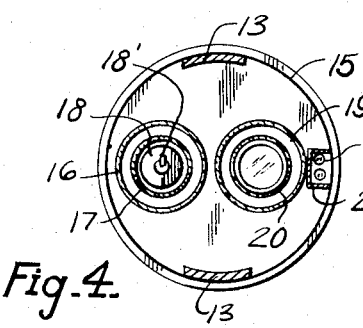
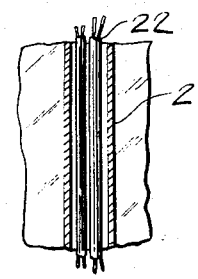
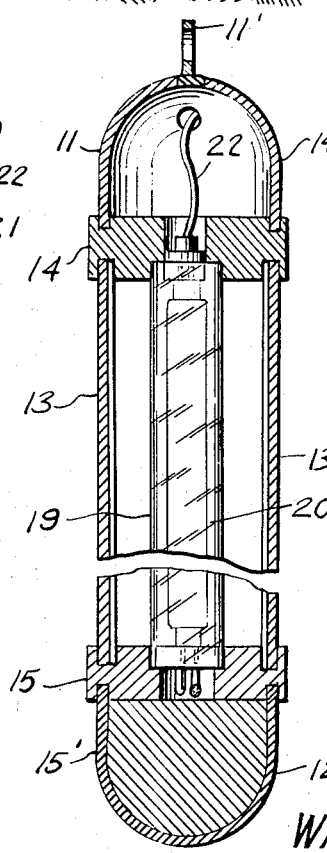
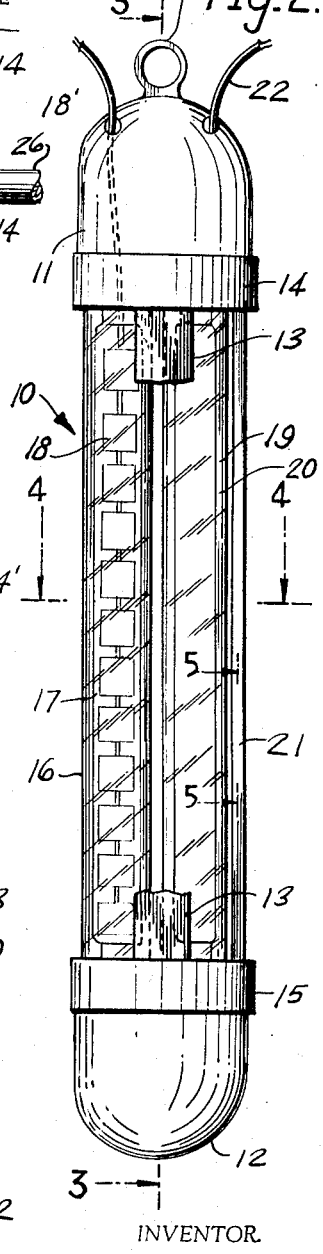
INVENTOR.
William V. Montgomery United States Patent Office
3,358,507
Patented Dec. 19, 1967

3,358,507
SEPTIC TANK SLUDGE INDICATOR
William V. Montgomery, Box 15A, Star Route,
Three Springs, Pa. 17264
Filed Apr. 4, 1966, Ser. No. 539,811
5 Claims. (Cl. 73—290)

This invention relates to various indicating devices for pools, tanks, etc., and more particularly a septic tank sludge indicator.

It is therefore the main purpose of this invention to provide a septic tank sludge indicator which enables the owner of a septic tank to notice an accumulation of sludge within the tank without having to remove the cover thereof.

Another object of this invention is to provide a septic tank sludge indicator which will enable avoiding clogged drains, damage to bath-room floors, high plumbing costs, etc.

Another object of this invention is to provide a septic tank sludge indicator which makes use of selenium cells for conversion of the light into an electric current which is adapted to indicate on a D.C. milliamperemeter the density of sludge particles within the tank.

Still another object of this invention is to provide a septic tank sludge indicator which is inexpensve to manufacture, is of rigid construction, provides very accurate indication of sludge content, and may be installed in any septic tank.

Other objects and advantages of this invention will become apparent from a consideration of the following detailed description taken in connection with the accompanying drawing, wherein a satisfactory embodiment of the invention is shown. However, it is to be understood that the invention is not limited to the details disclosed but includes all such variations and modifications as fall within the spirit of the invention and the scope of the appended claims.

In the drawing:

FIGURE 1 is a cross-sectional view of a conventional septic tank showing the invention in operative use.

FIGURE 2 is a front elevational view of the invention.

FIGURE 3 is a cross-sectional view taken along the lines 3—3 of FIGURE 2.

FIGURE 4 is a top plan view taken along the lines 4—4 of FIGURE 2.

FIGURE 5 is a fragmentary sectional view taken along the lines 5—5 of FIGURE 2.

According to this invention, a septic tank sludge indicator 10 is provided with top and bottom covers 11 and 12 which are spaced from each other by means of transparent support braces 13. The peripheral portions of top cover 11 and the upper extremities of braces 13 are fixedly secured within an upper support disc 14 which, in turn, is provided with a centrally positioned hole 14'. Likewise, a bottom support disc 15 is provided for fixedly securing the peripheral portion of the bottom cover 12 and the downwardly extending ends of the support braces 13, thereby constituting a housing for the indicator 10. An elongated transparent tube 16, preferably made of glass, is used for housing a cylindrical casing 17 which is designed to support a plurality of selenium cells 18 connected to each other in a parallel relationship. Another elongated tube 19 is spaced from tube 16 and is adapted to secure a light source 20, such as, a fluorescent tube. It should be noted that cylindrical shield 21 is provided for housing electric wires 22 which extend from the bottom portion of said light source 20. Thus the electric wire 18', which is directly connected with the selenium cells 18 extends outwardly from the indicator 10 and is suitably secured to a D.C. milliamperemeter (not shown). Wires 22 extending from shield 21 are suitably secured to a power source (not shown) for the light source 20. The top cover 11 is provided with an eyelet member for attaching a cord 14' to said eyelet and thereby suspending the indicator 10 within the hole 24 of a septic tank 23.

As it is seen from FIGURE 1, tank 23 is provided with an inlet pipe 25 and an outlet pipe 26, which outlet pipe is designed to remove sludge particles 28 from the water lever 27 in accordance with the current indications shown on the milliamperemeter.

Looking now at the drawing, one will see that when the sludge particles clog main portion of transparent tube 16 D.C. meter will show a reduced amount of current. This happens because when the selenium cells are subjected to a source of light, they begin to generate an electric current, depending on the size of an individual cell and the plurality of cells. It is also known when said cells 18 are connected in parallel to each other the electric current will flow at its maximum capacity therefore a partial obstruction of selenium cells will cause a reduction of current flow within the previously mentioned parallel circuit. This also causes a reduced indication of current flow on D.C. meter.

It will also be noted that said meter is conveniently calibrated to read the thickness of sludge 28 within the tank 23 in inches or centimeters. Also, if desired, D.C. meter may be divided in zones, such as, "danger", " safe" zones.

What I now claim is:

1. A septic tank sludge indicator comprising, in combination, an outer tube, an inner tube within said outer tube, a plurality of selenium cells connected in parallel to each other, said cells being secured and positioned within said inner tube, an elongated cylindrical casing for an electric light source in spaced parallel from said outer tube, top and bottom support discs for providing securing means to the top and bottom portions of said outer tube and said elongated casing, a pair of elongated braces secured between said support discs, a substantially semi-spherical top cover member having a pair of holes therein said member secured to said top support disc, a substantially semi-spherical bottom cover member secured to said bottom support disc, an electric wire connected to said selenium cells, said wire extending outwardly from said one hole of said top cover member, an elongated non-conductive flexible shield secured between said discs and positioned adjacent said elongated casing, a pair of electric wires extending from said light source, said pair of wires being positioned within said shield, said wires adapted to extend outwardly from said other hole of said top cover member, said indicator removably secured within said septic tank, an electrical measuring means for measuring flow of electric current emitted from said selenium cells, said measuring means connected to said electric wire, and said means being capable of visually indicating the ratio of density and the thickness of sludge above the clean water level within said tank when said sludge communicates with said outer tube of said indicator thereby preventing the affected selenium cells from generating the electric current.

2. The combination according to claim 1, wherein said electric light source includes a suitable fluorescent light bulb.

3. The combination according to claim 1, wherein an eyelet member is secured on said top cover member for providing support means to said indicator when it is positioned within said septic tank.

4. The combination according to claim 1, wherein said top and bottom support discs are provided with a plurality of holes for fixedly supporting said outer tube and said elongated casing between said elongated braces.

5. The combination according to claim 1, wherein said electrical measuring means include a direct current milliamperemeter provided with a series resistor for indicating the electric generated by said selenium cells.

References Cited

UNITED STATES PATENTS 3,120,125   2/1964   Vasel _____ 73—290 XR

DAVID SCHONBERG, *Primary Examiner.*
D. O. WOODIEL, *Assistant Examiner.*